E. KERR & J. SMITH.
MOLD FOR HOLLOW ARTICLES.
APPLICATION FILED SEPT. 1, 1908.

918,328.

Patented Apr. 13, 1909.
5 SHEETS—SHEET 1.

WITNESSES:

INVENTORS
Edward Kerr
James Smith
by Christy and Christy
Atty's

E. KERR & J. SMITH.
MOLD FOR HOLLOW ARTICLES.
APPLICATION FILED SEPT. 1, 1908.

918,328.

Patented Apr. 13, 1909.
5 SHEETS—SHEET 2.

E. KERR & J. SMITH.
MOLD FOR HOLLOW ARTICLES.
APPLICATION FILED SEPT. 1, 1908.

918,328.

Patented Apr. 13, 1909.
5 SHEETS—SHEET 3.

WITNESSES:

INVENTORS
Edward Kerr
James Smith
by Christy and Christy
Atty's

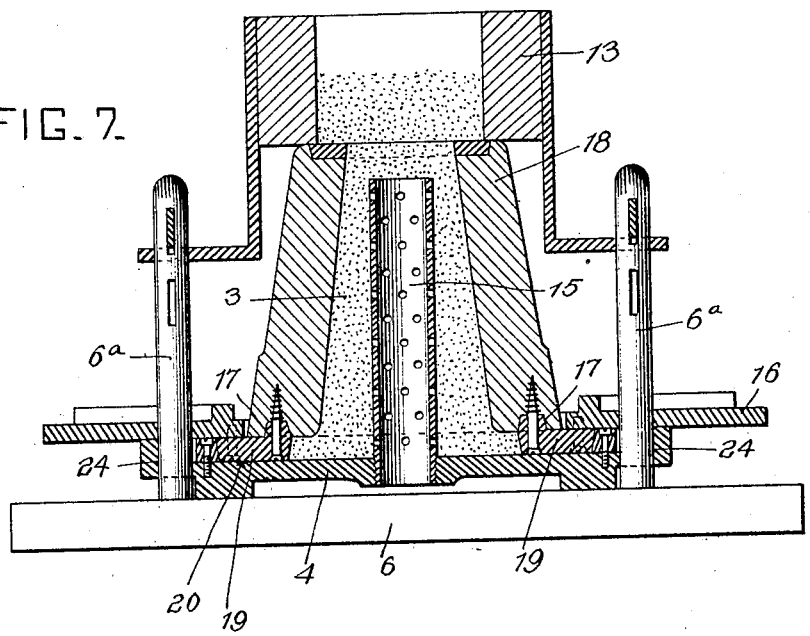
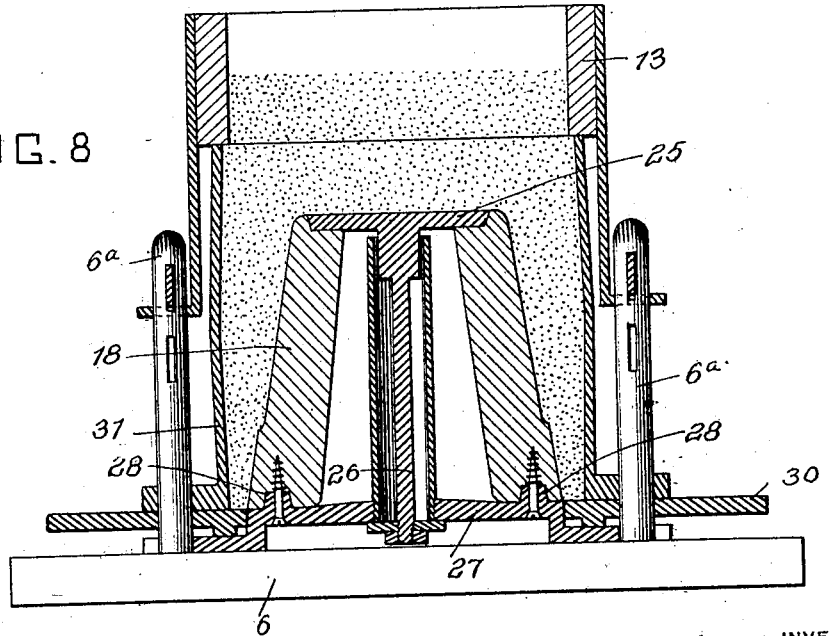

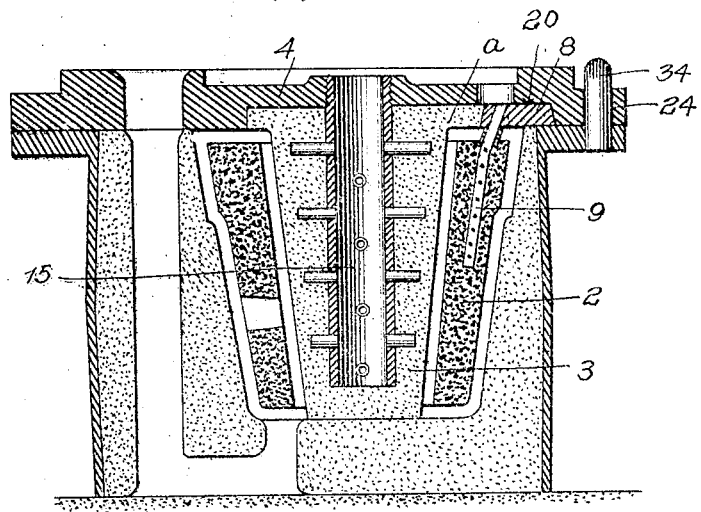
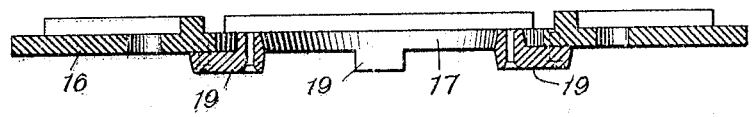
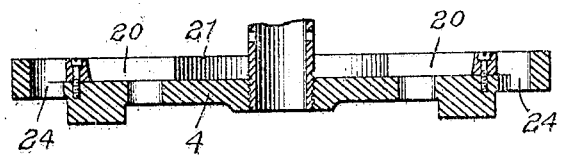

UNITED STATES PATENT OFFICE.

EDWARD KERR AND JAMES SMITH, OF PITTSBURG, PENNSYLVANIA.

MOLD FOR HOLLOW ARTICLES.

No. 918,328.   Specification of Letters Patent.   Patented April 13, 1909.

Application filed September 1, 1908. Serial No. 451,230.

*To all whom it may concern:*

Be it known that we, EDWARD KERR and JAMES SMITH, residing at Pittsburg, in the county of Allegheny and State of Pennsylvania, citizens of the United States, have invented or discovered certain new and useful Improvements in Molds for Hollow Articles, of which improvements the following is a specification.
The invention described herein relates to certain improvements in the formation of molds for hollow annular articles such as twyer boxes, coolers, etc.

The invention is hereinafter more fully described and claimed.

Figure 1:
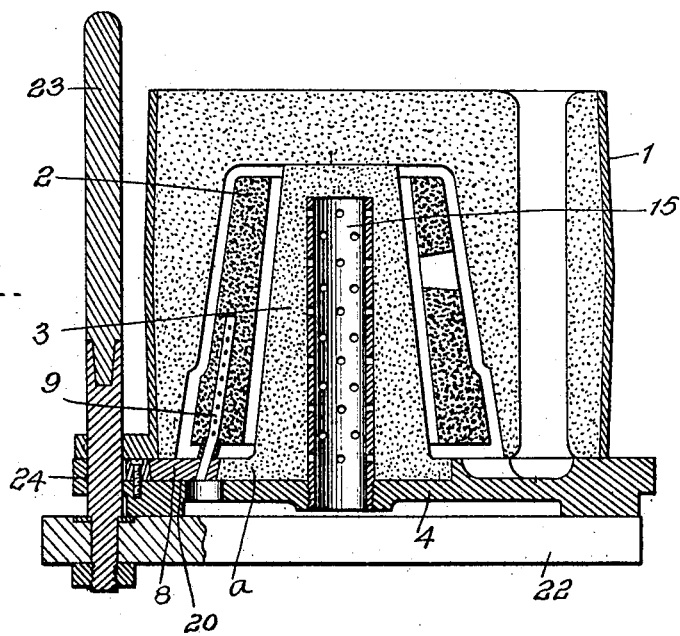
Figure 2:
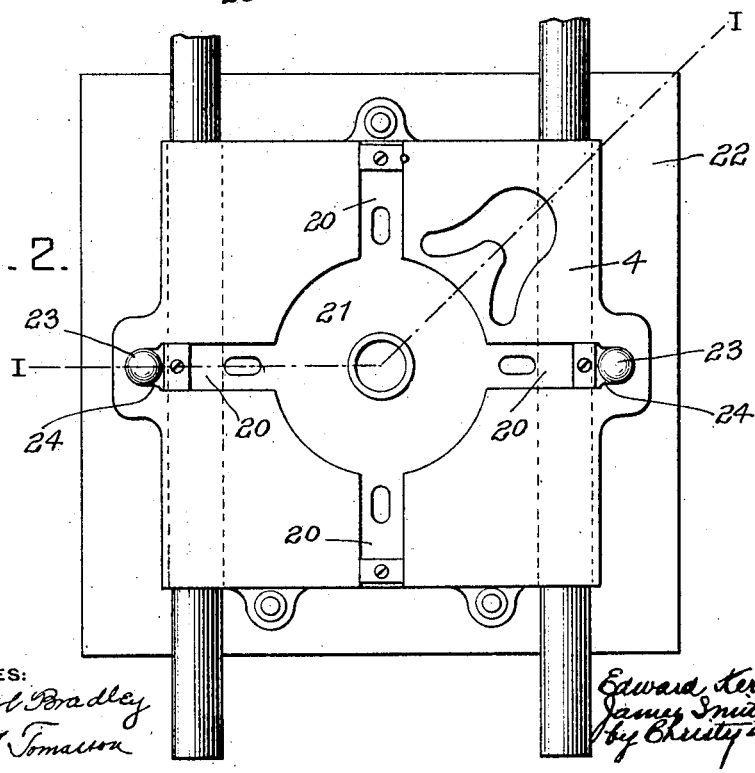
Figure 3:
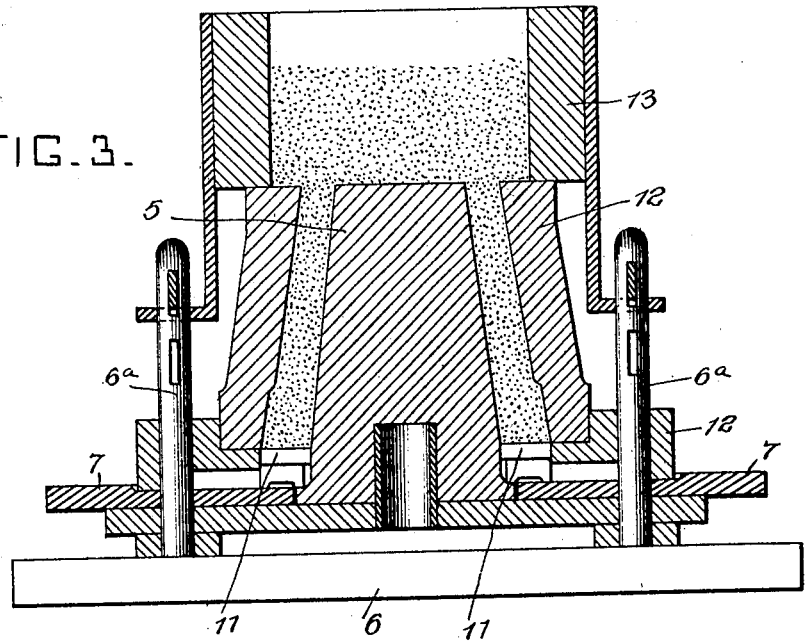
Figure 4:
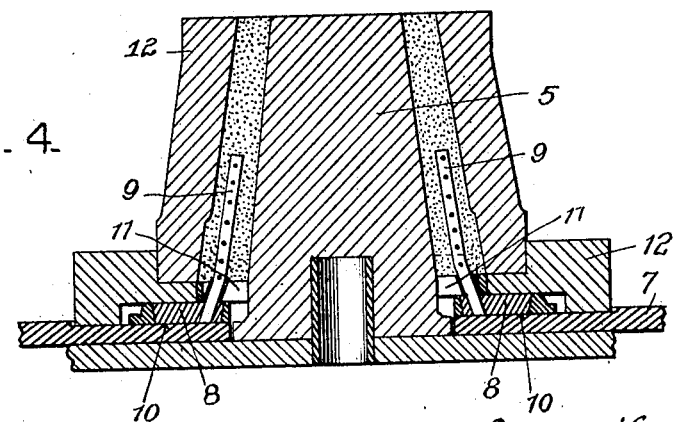
Figure 5:
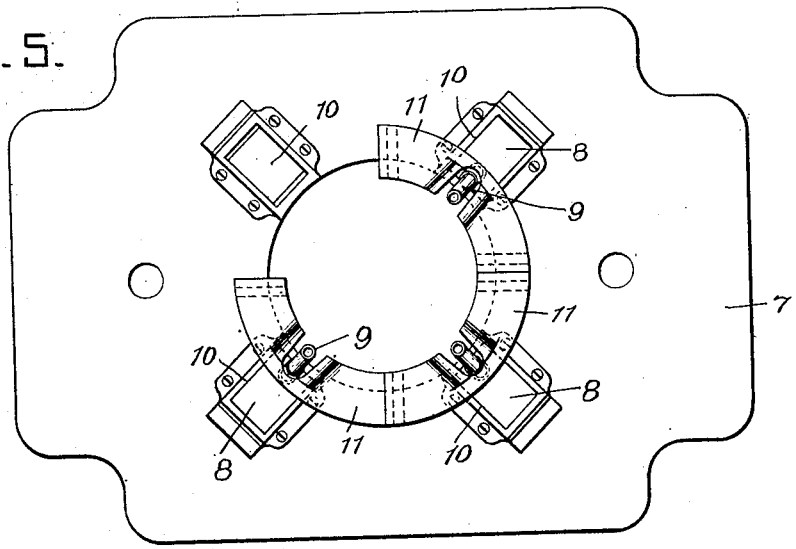
Figure 6:
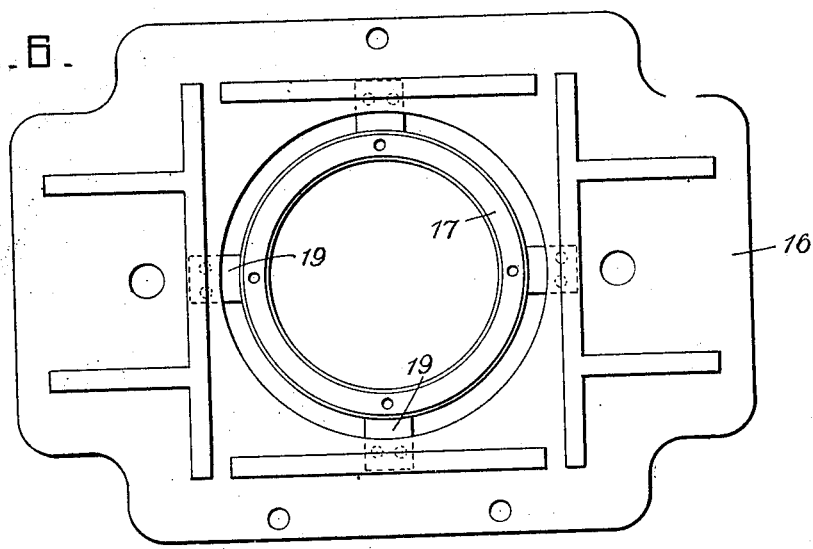

In the accompanying drawings forming a part of this specification Figure 1 is a sectional elevation of a completed mold for twyer box. Fig. 2 is a plan view of matrix closing plate and annular core support. Figs. 3 and 4 are sectional elevations in different planes of the parts employed for forming the annular core, Fig. 5 is a plan view of plate employed in forming the annular core and showing the core anchors and thickness rings in place thereon; Fig. 6 is a plan view of the stripper plate for the interior or green sand core; Fig. 7 is a sectional view of the parts employed in forming the interior or green sand core, Fig. 8 is a sectional elevation showing the manner of forming the main mold, Fig. 9 is a sectional elevation of a completed mold showing the cores suspended from the closing plate;
Figs. 10 and 11 are sectional view of the plates shown in Figs. 5 and 6.

The mold consists as shown in Fig. 1 of the main mold or flask 1 in which the entire matrix is formed, the core 2 forming the cavity in the annular body to be formed, the interior core 3 and the matrix closing and core supporting plate 4. The formation of the cores in the order mentioned and the main mold will be separately described.
In forming the annular core 2, a pattern block 5 of the desired shape and size is properly centered on a mold board 6 having guide pins 6ª. A stripping plate 7 having an opening of a diameter a little greater than the largest diameter of the pattern block is placed on the mold board around the pattern block being guided to position by the pins 6ª passing through holes in the plate. The shoes 8 carrying the ventilating and anchoring rods 9 are next placed in position in radially arranged seats 10 on the stripping plate, as shown in Figs. 4 and 5. In order to prevent metal from adhering to the unprotected portions of the rods 9, the portions thereof adjacent to the shoes are covered with some resisting material as asbestos paper. Ring sections 11 are next placed around the pattern block, the sections being slotted for the reception of the anchor rods and being supported by the shoes 8 as shown in Figs. 3, 4 and 5. These sections which are removed as hereinafter described, determine the thickness of the metal at the large or outer end of the twyer box. The core box 12 which may be made in sections as shown, is then placed in position. Material suitable for a baked core is then packed in the space between the pattern block and core box by any suitable means as for example a jarring machine, in which case a banking frame 13 is placed on the core box, and clamped down to the bed 6 of the jarring machine, thereby holding the several parts described in position. The board 6 may be the bed of a molding machine, or the usual mold board when the parts are formed by hand. After the core has been formed, the banking frame is removed and the core box raised up from the core. The stripping plate is then lifted stripping the completed core from the pattern block and the distance ring sections are drawn out leaving the core supported wholly by the ventilating pipes or bars 9, as shown in Fig. 1. The core supported by the plate 7 is then placed in a suitable oven to dry and harden. The next step in the preparation of the mold is the formation of the central or green sand core 3, which is supported and ventilated by a tubular core bar 15. This core bar is secured in a centrally located opening in the plate 4, and a stripping plate 16 is placed on the plate 4 around the core bar. The plates 4 and 16 are provided with holes for the reception of the guide pins 6ª on the mold board or bed 6.
The stripping plate 16 is provided with rim or bead 17 adapted to extend into a groove in the lower end of the core box 18 and with blocks 19 corresponding to the shoes 8 and adapted to fit into seats 20 in the plate 4. The engagements of the blocks 19 with the seats 20 insures the proper centering of the core box on the plate 4. The lower end or point a of the core is formed in a circular recess 21 in the plate 4 as clearly shown in Fig. 11 and forms a portion of the model matrix as shown in Figs. 1 and 9. After the sand has been properly tamped in the core box (if desired such tamping can be done in a jarring machine as indicated in Fig. 7) the plate 16 is lifted stripping the core box from the core 3, and the plate 4 with the core in position thereon is placed on the board 22 provided with guide pins 23 for properly centering the different parts of the mold, said pins passing through holes 24 in the plate 4.

In forming the main matrix the core box 18 may be used as pattern, or a separate pattern may be used. When the core box is used for a pattern as shown in Fig. 8, its upper end is closed by a disk 25, which is provided with a threaded stem 26 extending down through a pattern plate 27. The pattern is properly centered on the plate by a rib 28 projecting into a groove in the end of the pattern, and the latter is clamped in position by a nut 29 screwing on the stem 26. It will be observed that the pattern is supported on a raised portion of the plate 27 and that a stripping plate 30 is passed over this raised portion and rests on the pattern plate.

A suitable flask 31 is placed on the stripping plate 30 being guided to position by pins 6ª, the pattern and stripping plates and the flask being provided with holes for the reception of the pins. The sand can be packed on the flask around the pattern in any suitable manner, as for example by a jarring machine in which case the several parts mentioned are clamped to the bed of the machine by a banking frame 13, as heretofore described. After the completion of the mold, the banking frame is removed, and the mold is stripped from the pattern by lifting the plate 30.

Before placing the mold 1 on the plate 4, the core 2 is placed in position around the green sand core 3 the position of the core 2 being determined by the seats 20 into which the shoes 8 on the rods 9 enter after the core 2 has been placed in position, the portion 1 of the mold is lowered down over the cores being guided to proper position on the plate 4 by pins 23 passing through holes in lugs 33 on the flask 31.

It will be observed that the matrix for the formation of the article is wholly with a single flask and that the matrix is formed with one end closed while the opposite end of the matrix is closed by the plate 4 which also supports the several cores. When the cores and mold are placed together as shown in Fig. 1 the guide pins 23 should extend up somewhat above the cores as the operator cannot observe the relative positions of the parts, when lowering the mold over the cores. The number and arrangement of these guide pins will be varied to suit requirements, the larger the mold the more pins will be employed.

As shown in Fig. 9 the mold 1 can be placed open end up in the casting floor and the core 2 placed in position its shoes 8 resting on the end of the flask. The plate 4 having the core 3 firmly secured thereto is then turned over so that the core will be suspended from the plate, and lowered onto the flask, the core 3 being centered by the pins 34 on the flask entering holes 24 on the plate and also by the shoes 8 entering the seats 20.

It is characteristic of our invention that the several parts of the completed mold, i. e., the annular core, the central core and the main matrix or mold are separately formed on independent plates each of which is provided with corresponding guide elements and with means to insure that the mold element formed on each plate shall have a predetermined position relative to the guide element of such plate. It will be observed that the central core is formed on the plate 4 which in the completed mold forms the drag as in Fig. 1 or the cope as in Fig. 9 one end of said core fitting in a recess in said plate which is also provided with seats for properly locating the annular core with reference to the central core and that suitable guiding means are employed on the plate and flask to insure the proper adjustment of the main matrix relative to the annular core. By supporting the cores on a rigid metal plate having means insuring the proper relative positions of the cores and the main matrix relative to the cores, the formation of defective castings due to the shifting of one of the shaping elements is reduced to a minimum.

No claim is made herein for the mold shown and described as the same will form the subject-matter of an application to be filed in due time.

We claim herein as our invention:

1. The combination of a board, a core pattern supported by the board, a plate resting on the mold board around the pattern and provided with radially arranged seats, anchoring rods provided with shoes fitting in said seats, a thickness ring formed in sections and arranged around the pattern and supported by the shoes, and a core box supported by the plate.

2. As a means for forming molds the combination of a mold board provided with guide pins, plates for the formation of cores and main matrix provided with holes for the reception of said pins, a flask also provided with guide holes, said plates being provided with means for supporting the shaping parts in proper relation to the guide holes.

3. The combination of a board having a plurality of guide pins, a core supporting plate and a flask each having holes corresponding in position to the guide pins.

In testimony whereof, we have hereunto set our hands.

EDWARD KERR.
JAMES SMITH.

Witnesses:
CHARLES BARNETT,
FRANCIS J. TOMASSON.